US009218083B2

(12) United States Patent
Tseng et al.

(10) Patent No.: US 9,218,083 B2
(45) Date of Patent: Dec. 22, 2015

(54) METHODS FOR PARSING CONTENT OF DOCUMENT, HANDHELD ELECTRONIC APPARATUS AND COMPUTER-READABLE MEDIUM THEREOF

(71) Applicant: HTC Corporation, Taoyuan County (TW)

(72) Inventors: Te-Pei Tseng, Taoyuan County (TW); Huan-Chih Tseng, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 330 days.

(21) Appl. No.: 13/744,420

(22) Filed: Jan. 18, 2013

(65) Prior Publication Data

US 2013/0187880 A1 Jul. 25, 2013

Related U.S. Application Data

(60) Provisional application No. 61/588,669, filed on Jan. 20, 2012.

(51) Int. Cl.
- *G06F 3/041* (2006.01)
- *G06F 17/24* (2006.01)
- *G06F 17/27* (2006.01)

(52) U.S. Cl.
CPC .............. *G06F 3/0412* (2013.01); *G06F 17/24* (2013.01); *G06F 17/272* (2013.01)

(58) Field of Classification Search
CPC .................. G06F 3/041; G06F 3/0412; G06F 3/048–3/04897; G06F 17/24; G06F 17/27–27/2795; G06F 17/3089–17/30905
See application file for complete search history.

(56) References Cited

U.S. PATENT DOCUMENTS

| 6,961,943 | B2 | 11/2005 | Miller et al. | |
|---|---|---|---|---|
| 7,162,571 | B2 | 1/2007 | Kilian et al. | |
| 2002/0016801 | A1* | 2/2002 | Reiley et al. | 707/523 |
| 2002/0069223 | A1* | 6/2002 | Goodisman et al. | 707/513 |

(Continued)

FOREIGN PATENT DOCUMENTS

| CN | 101232664 | 7/2008 |
|---|---|---|
| CN | 101345966 | 1/2009 |
| CN | 101631341 | 1/2010 |

(Continued)

OTHER PUBLICATIONS

"Notice of Allowance of Taiwan Counterpart Application", issued on Oct. 23, 2014, pp. 1-4.

(Continued)

*Primary Examiner* — Nathan Danielsen
(74) *Attorney, Agent, or Firm* — Jianq Chyun IP Office

(57) ABSTRACT

A method for parsing a content of a document, a handheld electronic apparatus and a computer-readable medium thereof are provided. The method comprises the following steps: displaying the content of the document; parsing the content to find out text groups according to a preset pattern database when a touch event is detected, wherein the preset pattern database comprises a plurality of specific patterns, and a format of each of the text groups conforms to one of the specific patterns; determining whether a touch coordinates matches a corresponding position of a specific text group of the text groups; performing a corresponding action related to the specific text group when the touch coordinates matches the corresponding position of the specific text group.

17 Claims, 3 Drawing Sheets

(56) References Cited

U.S. PATENT DOCUMENTS

2007/0274300 A1    11/2007    Chu et al.
2013/0054613 A1*   2/2013     Bishop ..................... 707/748

FOREIGN PATENT DOCUMENTS

| CN | 101702840 | 5/2010 |
|----|-----------|--------|
| TW | 201113719 | 11/2000 |
| TW | 200300532 | 6/2003 |
| TW | 201020989 | 6/2010 |
| TW | 201031162 | 8/2010 |
| TW | 201118589 | 6/2011 |

OTHER PUBLICATIONS

"Office Action of China Counterpart Application", issued on Aug. 5, 2015, pp. 1-18.

* cited by examiner

METHODS FOR PARSING CONTENT OF DOCUMENT, HANDHELD ELECTRONIC APPARATUS AND COMPUTER-READABLE MEDIUM THEREOF

CROSS-REFERENCE TO RELATED APPLICATION

This application claims the priority benefits of U.S. provisional application Ser. No. 61/588,669, filed on Jan. 20, 2012. The entirety of the above-mentioned patent applications is hereby incorporated by reference herein and made a part of this specification.

BACKGROUND

1. Field of the Invention

The invention relates to a parsing method, and more particularly to a method for parsing a content of a document.

2. Description of Related Art

Nowadays, there are a lot of specific structures that have semantic significance such as telephone numbers, e-mail addresses, webpage addresses, zip codes and dates in computer documents. In a typical day, for example, a user may receive extensive files from word-processing programs and e-mail that contain several of these structures.

However, when the user wants to perform some operations according to the specific structures, the user have to manually copy the content of the structures to the desired regions, which is an inconvenient way of operating an electronic device.

SUMMARY

Accordingly, the present disclosure is directed to methods for parsing a content of a document and handheld electronic apparatus thereof, which may parse the content after a touch event is detected and automatically execute corresponding actions.

A method for parsing a content of a document is introduced herein. According to an exemplary embodiment, the method may be adapted to a handheld electronic apparatus and comprise the following steps: displaying the content of the document; parsing the content to find out text groups according to a preset pattern database when a touch event is detected, wherein the preset pattern database comprises a plurality of specific patterns, and a format of each of the text groups conforms to one of the specific patterns; determining whether the touch coordinates matches a corresponding position of a specific text group of the text groups; performing a corresponding action related to the specific text group when the touch coordinates matches the corresponding position of the specific text group.

In an embodiment of the present disclosure, the method further comprising activating a browser to download the document from a webpage for displaying the content of the document, wherein the browser supports a text parsing function for parsing the content to find out the text groups according to the preset pattern database.

In an embodiment of the present disclosure, the step of activating the browser to download the document from a webpage further comprises: disabling the text parsing function; transforming the content of the webpage into an object model; parsing the object model according to a markup language rule; generating an object parsed result.

In an embodiment of the present disclosure, when the touch event is detected, further comprises: enabling the text parsing function; removing the object parsed result; re-parsing the object model according to the markup language rule; parsing the content to find out the text groups according to the preset pattern database by the text parsing function; generating a full parsed result.

In an embodiment of the present disclosure, after the step of determining whether the touch coordinates matches the corresponding position of the specific text group of the text groups, further comprises: removing the full parsed result when the touch coordinates does not match the corresponding position of the specific text group.

In an embodiment of the present disclosure, after the step of performing the corresponding action related to the specific text group, further comprises: removing the full parsed result.

In an embodiment of the present disclosure, after the step of transforming the content of the webpage into the object model, further comprises: removing the object parsed result if the object parsed result has existed.

In an embodiment of the present disclosure, after the step of parsing the content to find out the text groups, further comprises: detecting a touch up event; extracting the touch coordinates of the touch up event.

In an embodiment of the present disclosure, the method further comprises: activating a client application for displaying the content of the document.

In an embodiment of the present disclosure, when the touch event is detected, the method further comprises: copying the content by the client application to a storage unit; enabling a text parsing function for parsing the copied content to find out the text groups according to the preset pattern database.

In an embodiment of the present disclosure, when the touch event is detected, the method further comprises: extracting the touch coordinates of the touch event.

In an embodiment of the present disclosure, the specific patterns comprise e-mail address pattern, telephone number pattern, webpage address pattern, and geographic location pattern.

A handheld electronic apparatus is introduced herein. The handheld electronic apparatus comprises a touch display, a storage unit and a processing unit. The storage unit is configured to store a plurality of program instructions. The processing unit is coupled to the touch display, the storage unit and the parsing unit, and configured to execute the program instructions to execute a parsing procedure. The parsing procedure comprises the following steps: displaying a content of a document; parsing the content to find out text groups according to a preset pattern database when a touch event is detected, wherein the preset pattern database comprises a plurality of specific patterns, and a format of each of the text groups conforms to one of the specific patterns; determining whether a touch coordinates matches a corresponding position of a specific text group of the text groups; performing a corresponding action related to the specific text group when the touch coordinates matches the corresponding position of the specific text group.

A computer-readable medium storing a plurality of program instructions for loading into a handheld electronic device to execute the following steps is introduced herein. The steps comprise: displaying a content of a document; parsing the content to find out text groups according to a preset pattern database when a touch event is detected, wherein the preset pattern database comprises a plurality of specific patterns, and a format of each of the text groups conforms to one of the specific patterns; determining whether a t touch coordinates matches a corresponding position of a specific text group of the text groups; performing a corresponding action related to the specific text group when the touch coordinates matches the corresponding position of the specific text group.

A method for parsing a content of a document, adapted to a handheld electronic apparatus is introduced herein. The method comprises the following steps: activating a browser to download the document from a webpage for displaying the content of the document, wherein the browser supports a text parsing function; enabling the text parsing function when a touch event is detected; parsing the content to find out text groups according to a preset pattern database by the text parsing function, wherein the preset pattern database comprises a plurality of specific patterns, and a format of each of the text groups conforms to one of the specific patterns; extracting touch coordinates of a touch up event when the touch up event is detected; determining whether the touch coordinates matches a corresponding position of a specific text group of the text groups; performing a corresponding action related to the specific text group when the touch coordinates matches the corresponding position of the specific text group.

A method for parsing a content of a document, adapted to a handheld electronic apparatus is introduced herein. The method comprises the following steps: activating a client application for displaying the content of the document; copying the content by the client application to a storage unit when a touch event is detected; extracting touch coordinates of the touch event; enabling a text parsing function for parsing the copied content to find out text groups according to a preset pattern database, wherein the preset pattern database comprises a plurality of specific patterns, and a format of each of the text groups conforms to one of the specific patterns; determining whether the touch coordinates matches a corresponding position of a specific text group of the text groups; performing a corresponding action related to the specific text group when the touch coordinates matches the corresponding position of the specific text group.

Based on the above description, the embodiments of the present disclosure provide effective method for parsing the contents of documents when a touch event is detected, such that the user may operate the handheld electronic apparatus in a more intuitive way.

In order to make the aforementioned and other features and advantages of the disclosure comprehensible, several exemplary embodiments accompanied with figures are described in detail below.

BRIEF DESCRIPTION OF THE DRAWINGS

The accompanying drawings are comprised to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

Figure 1A:
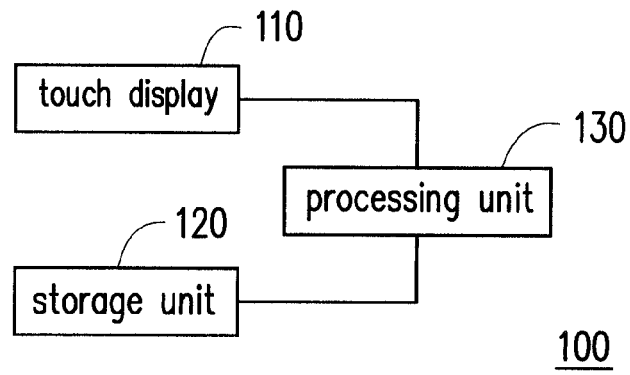
FIG. 1A is a functional block diagram illustrating a handheld electronic apparatus according to an exemplary embodiment of the present disclosure.

Some embodiments of the present application will now be described more fully hereinafter with reference to the accompanying drawings, in which some, but not all embodiments of the application are shown. Indeed, various embodiments of the application may be embodied in many different forms and should not be construed as limited to the embodiments set forth herein; rather, these embodiments are provided so that this disclosure will satisfy applicable legal requirements. Like reference numerals refer to like elements throughout.

FIG. 1A is a functional block diagram illustrating a handheld electronic apparatus according to an exemplary embodiment of the present disclosure. In this embodiment, the handheld electronic apparatus 100 comprises a touch display 110, a storage unit 120, and a processing unit 130. The touch display 110 may be implemented by integrating a touch screen and a display. The touch screen may be, for example, resistive or capacitive, which is not limited thereto. The display may comprise at least one of a liquid crystal display (LCD), a thin film transistor (TFT)-LCD, an organic light-emitting diode (OLED), a flexible display, a three-dimensional (3D) display and so forth.

The storage unit 120 is configured to store a plurality of program instructions, which may comprise at least one of a flash memory type storage medium, a hard disk type storage medium, a multimedia card micro type storage medium, a card type memory (e.g., a secure digital (SD) or extreme digital (XD) memory), a random access memory (RAM), and a read-only memory (ROM). The storage unit 120 may store various software programs, embedded software, or embedded firmware necessary for the handheld electronic apparatus 100. Further, the storage unit 120 may temporarily store various data such as a phonebook, messages, still images, or moving images. The handheld electronic apparatus 100 may operate a web storage, which performs the functions of the storage unit 120 on the Internet.

The processing unit 130 is coupled to the touch display 110 and the storage unit 120 and configured to execute the program instructions stored in the storage unit 120 to execute a parsing procedure. The processing unit 130 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, an ARM-based processor, and the like.

Figure 1B:
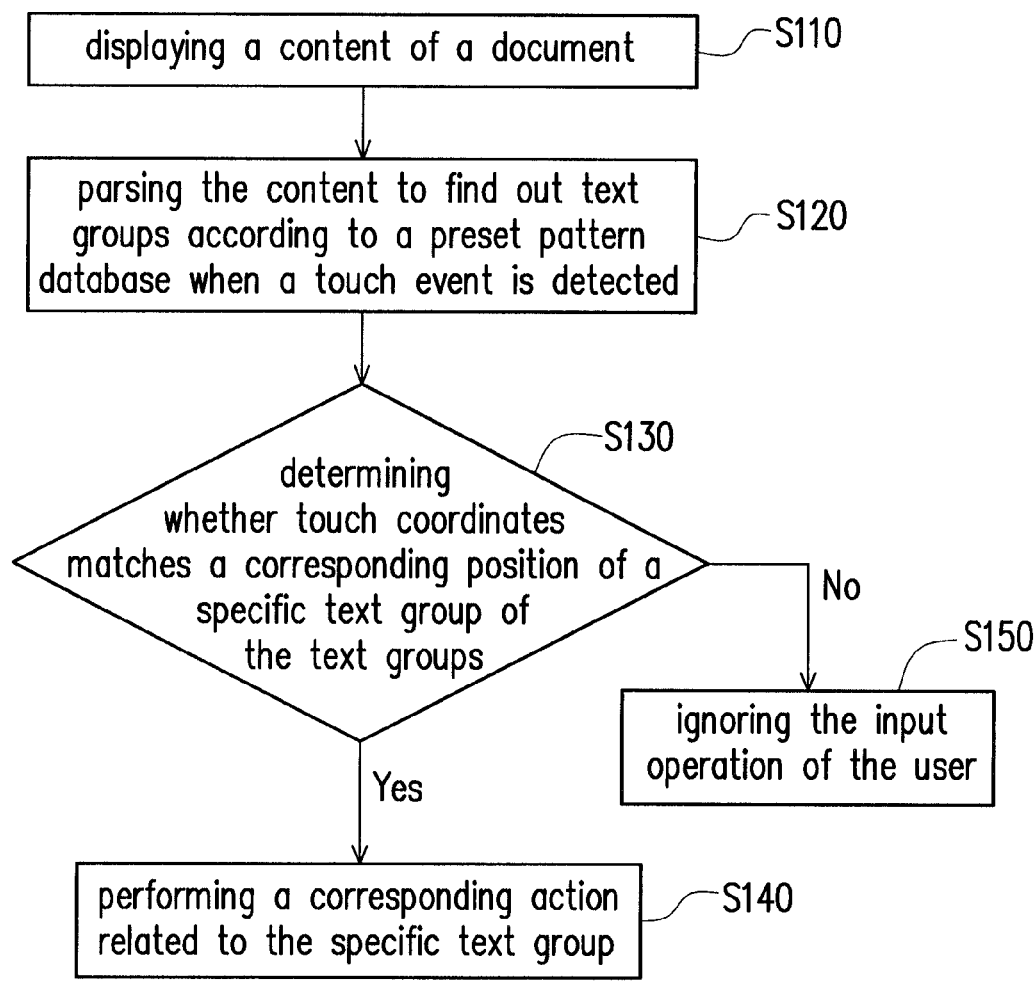
FIG. 1B is a flow chart illustrating a method for parsing a content of a document according to an exemplary embodiment of the present disclosure.

FIG. 1B is a flow chart illustrating a method for parsing a content of a document according to an exemplary embodiment of the present disclosure. Referring to both FIG. 1A and FIG. 1B, the proposed method for parsing the content of the document may be adapted for the foregoing handheld electronic apparatus 100, but the disclosure is not limited thereto. In step S110, the touch display 110 may display the content of the document. The document may comprise at least one of a webpage, a text file, a phonebook, a message, a contact list, or the like.

In step S120, the processing unit 130 may parse the content of the document to find out text groups according to a preset pattern database when a touch event is detected by the touch display 110. The preset pattern database may be stored in, but not limited to, a web server or the storage unit 120, and the preset pattern database may comprise a plurality of specific patterns of text groups. The specific patterns may be, for example, an e-mail address pattern, a telephone number pattern, a webpage address pattern, or a geographic location pattern, which is not limited thereto. Besides, a format of each of the text groups conforms to one of the specific patterns. To be specific, a text group comprises one or a combination of numbers, letters, words, symbols, strings, or the like, whose format corresponds to one of the specific patterns stored in the preset pattern database.

For example, one of the specific patterns may comprise a combination of words and symbols like "www.*.." or "http://**." (where the "*" represents any combination of alphabets and numbers), which are common formats of a webpage address. Therefore, when a first text group appears in a format like "www.example.com", the first text group may be regarded as matching the format of a webpage address pattern, i.e., matching one of the specific patterns. For another example, one of the specific patterns may comprise a combination of numbers like "09xx-xxx-xxx" (where the "x" represents a number of 0-9), which is a common format of a telephone number pattern. Therefore, when a second text group appears in a format like "0987-654-321", the second text group may be regarded as matching the format of the telephone number pattern. To the persons with ordinary skill in the art, it should be easily understood that text groups appearing in formats like "*@*." and "* city, * road, * section" can be regarded as respectively matching the e-mail address pattern and the geographic location pattern, which are not limited thereto.

In another embodiment, the processing unit 130 may parse the content of the document to find out only the text groups without pre-defined function, such as anchor, input, button, etc. in a HTML document.

In another point of view, the processing unit 130 may be considered to start parsing the content of the document after a touch event occurs, such that the text groups of the content matching the specific patterns could be found. In some embodiments, the found text groups may be respectively given a link (e.g., a hyperlink) for facilitating the following procedure of performing the desired operation of the user.

Hence, in step S130, the processing unit 130 may determine whether a touch coordinates matches a corresponding position of a specific text group of the found text groups, for example by determining whether the touch coordinates fall within a bounding rectangle of the specific text group of the found text groups. When the touch coordinates matches the corresponding position of the specific text group, in step S140, the processing unit 130 may perform a corresponding action related to the specific text group. The corresponding action may be, for example, accessing a webpage when the specific text group matches the format of the webpage address pattern, activating an e-mail application when the specific text group matches the format of the e-mail address pattern, positioning a location on a map when the specific text group matches the format of the geographic location pattern, making a call when the specific text group matches the format of the telephone number pattern. When the touch coordinates does not match the corresponding position of the specific text group, in step S150, the processing unit 130 may just ignore the input operation of the user.

For example, when the user of the handheld electronic apparatus 100 makes the touch display 110 generate a touch event by touching the displayed position of the first text group (i.e., "www.example.com") on the touch display 110, the processing unit 130 would firstly parse the content to find out the text groups existed in the content, and then extracting the touch coordinates of the touch event. When the processing unit 130 determines that the touch coordinates matches the displayed position of the first text group (i.e., "www.example.com"), the processing unit 130 would, for example, access the webpage corresponding to the first text group (i.e., "www.example.com").

For another example, when the user of the handheld electronic apparatus 100 makes the touch display 110 generate a touch event by touching the displayed position of the second text group (i.e., "0987-654-321") on the touch display 110, the processing unit 130 would firstly parse the content to find out the text groups existed in the content, and then extracting the touch coordinates of the touch event. When the processing unit 130 determines that the touch coordinates matches the displayed position of the second text group (i.e., "0987-654-321"), the processing unit 130 would, for example, open a dialler function for making a phone call and display the number in a input field of the dialler function or directly make a call for the telephone number corresponding to second text group (i.e., "0987-654-321").

In some embodiments, the extracted coordinates of the touch event may be determined according to a "touch up event" of the touch event. Herein, the term "touch up event" represents the situation that a touch event ends, for example, the touching finger (or stylus) leaves the touch display 110, which is not limited thereto. Specifically speaking, the user may slide over the touch display 110 for performing other operations after touching the touch display 110 (i.e., generating the touch event), hence the touch coordinates are extracted by the processing unit 130 corresponds to the position where the touching finger (or stylus) leaves the touch display 110 (i.e., the position where the touch up event occurs).

The aforementioned implementation may be applied to software with functionalities of displaying documents, such as a browser or a client application. When the touch display 110 is touched by the user, the processing unit 130 starts to parse the content to find out the text groups matching the specific patterns. For example, a list may be generated for saving the text groups that match the specific patterns, and the list only exists in the duration of the touch event being detected. Some embodiments will be respectively provided in the following descriptions to clarify the parsing method for the browser and the client application.

Figure 2:
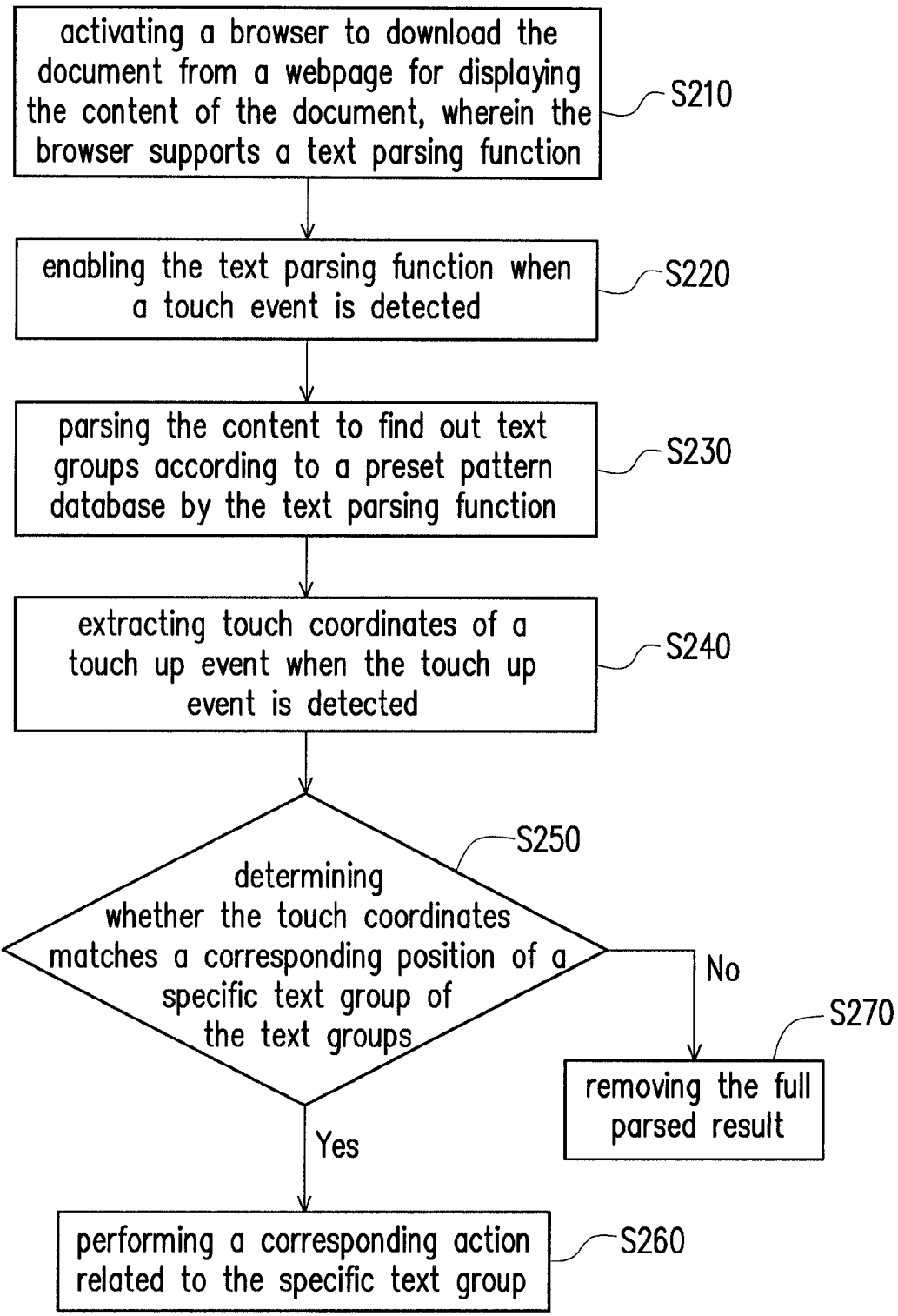
FIG. 2 is a flow chart illustrating a method for parsing a content of a document from a webpage according to an exemplary embodiment of the present disclosure.

FIG. 2 is a flow chart illustrating a method for parsing a content of a document from a webpage according to an exemplary embodiment of the present disclosure. Referring to both FIG. 1A and FIG. 2, the proposed method for parsing the content of the document from the webpage may be adapted for the foregoing handheld electronic apparatus 100, but the disclosure is not limited thereto. In step S210, the processing unit 130 may activate a browser to download the document from a webpage for displaying the content of the document. In this embodiment, the browser supports a text parsing function for parsing the content of the webpage to find out the text groups according to the preset pattern database.

In step S220, the processing unit 130 may enable the text parsing function when a touch event is detected. In the method, a flag set on the browser is used to enable or disable the text parsing function of the browser. Next, in step S230, the browser may parse the content of the webpage to find out text groups according to the preset pattern database by the text parsing function. The details of the text parsing function may be referred to the embodiments illustrated in FIG. 1A and 1B, which would not be described herein. In some embodiments, the found text groups may be highlighted by, for example, adding bottom lines, marking special colours, translating into bold type, etc.

In some embodiments, in order to follow the constructing standard of the webpage, the text parsing function may be disabled by, for example, the processing unit 130 after the browser being activated. Next, the browser may transform the content of the webpage into an object model (e.g., a document object model (DOM) or the like). When the webpage is interpreted in standards of markup languages such as hypertext markup language (HTML) or extensible markup language (XML), the browser may parse the object model (e.g., the document object model) according to a markup language rule (e.g., the rule of HTML parser or XML parser). After the object model is parsed, some specific strings such as webpage addresses that can be identified according to the markup language rule may be correspondingly found, and the found specific strings may be organized to generate an object parsed result. Accordingly, the original operating mechanism of loading the webpage by the browser would not be violated.

For example, specific strings (non-text groups) of the object model according to the markup language rule are parsed and non-text nodes which can accept user input (e.g. input field, link, anchor . . . ) are collected, and an action link or corresponding action is created. Herein, the nodes that match the markup language rule of the object model may be referred as "non-text nodes". And, since the text parsing function is disabled, only the parsing operation of the DOM will be executed, where the text parsing function for the text groups will be skipped. Therefore, the nodes matching the specific patterns such as the telephone number, the webpage address, or the e-mail address will not be highlighted here.

In some embodiments, when the object parsed result has existed after the content of the webpage being transformed into an object model, the existed object parsed result (i.e., the old object parsed result generated from the previous parsing procedure) may be removed since the information contained in the existed object parsed result may be out-of-date.

Herein, assuming that the object parsed result has been generated for following the original operating mechanism of loading the webpage by the browser, the object parsed result may be removed when the touch event is detected for not affecting the following procedure of parsing the text groups of the webpage. For example, an instruction is used to remove the previously generated object parsed result and re-pares the content of the webpage when the touch event is detected.

Next, the browser may re-parse the object model to find out specific strings according to the markup language rule, by a parser and find out the text groups according to the preset pattern database by the text parsing function. After the specific strings and the text groups are found, a full parsed result may be generated by combining the information of the found specific strings and text groups. For example, the full parsed result comprises highlights of the text groups (like e-mail address, telephone number, webpage address and geographic location) matched the forms of the preset patterns.

In step S240, the processing unit 130 may extract touch coordinates of a touch up event when the touch up event is detected. In step S250, the processing unit 130 may determine whether the touch coordinates of the touch up event matches a corresponding position of a specific text group of the text groups. And in step S260, the processing unit 130 may perform a corresponding action related to the specific text group when the touch coordinates matches the corresponding position of the specific text group. Herein, the details of the steps S250 and S260 may be referred to the embodiments illustrated FIG. 1B as well, which would not be further described.

When the touch coordinates of the touch up event does not match any of the corresponding position of the found text groups, in step S270, the full parsed result (which contains the information of the found specific strings and text groups) may be removed. In other embodiments, the full parsed result may also be removed after the processing unit 130 performing the corresponding action of the specific text group since the operation related to the current touch event has been executed. Moreover, after performing the step S260, the processing unit 130 may further perform the step S270 to remove the full parsed result.

Taking the DOM as an example, wherein the DOM comprises multiple nodes. The node that matches the format of the specific patterns may be referred as a text node, and the node that matches the format of the markup language rule may be referred as a non-text node. And a flag of the browser may be used to enable or disable the text parsing function of the browser. When the touch event is detected (e.g., the user does a touch gesture), the flag is turned on for enabling the text parsing function and then the full parsed result would be correspondingly obtained. When the touch up event is detected (e.g., the touch gesture is finished), the flag is turned off for disabling the text parsing function. And an notification object (which is an abstract description of an operation to be performed), for example the intent object in Android system, is sent to the application or function related to the corresponding action when the touch coordinates of the touch up event matches the position of the said text node, and the corresponding action may be performed. Moreover, an instruction is used to remove the previously parsed result and re-parse the webpage.

Taking the browser of Android system as an example, WebView.java is used for viewing a webpage. WebViewCore.cpp may be modified to disable the text parsing function by default. Thus, when the webpage is firstly loaded, no text group (i.e. text node) would be found out. That is, no highlighted structure would appear in the user interface and no link information would be stored. After the user performs a touch gesture (i.e., the touch event is detected), the text parsing function is enabled and CacheBuilder.java will re-parse the DOM for obtaining the full parsed result. After the user's touch gesture is completed (e.g., a finger moving up or a long press over 3 seconds etc.), the full parsed result is cleared.

Figure 3:
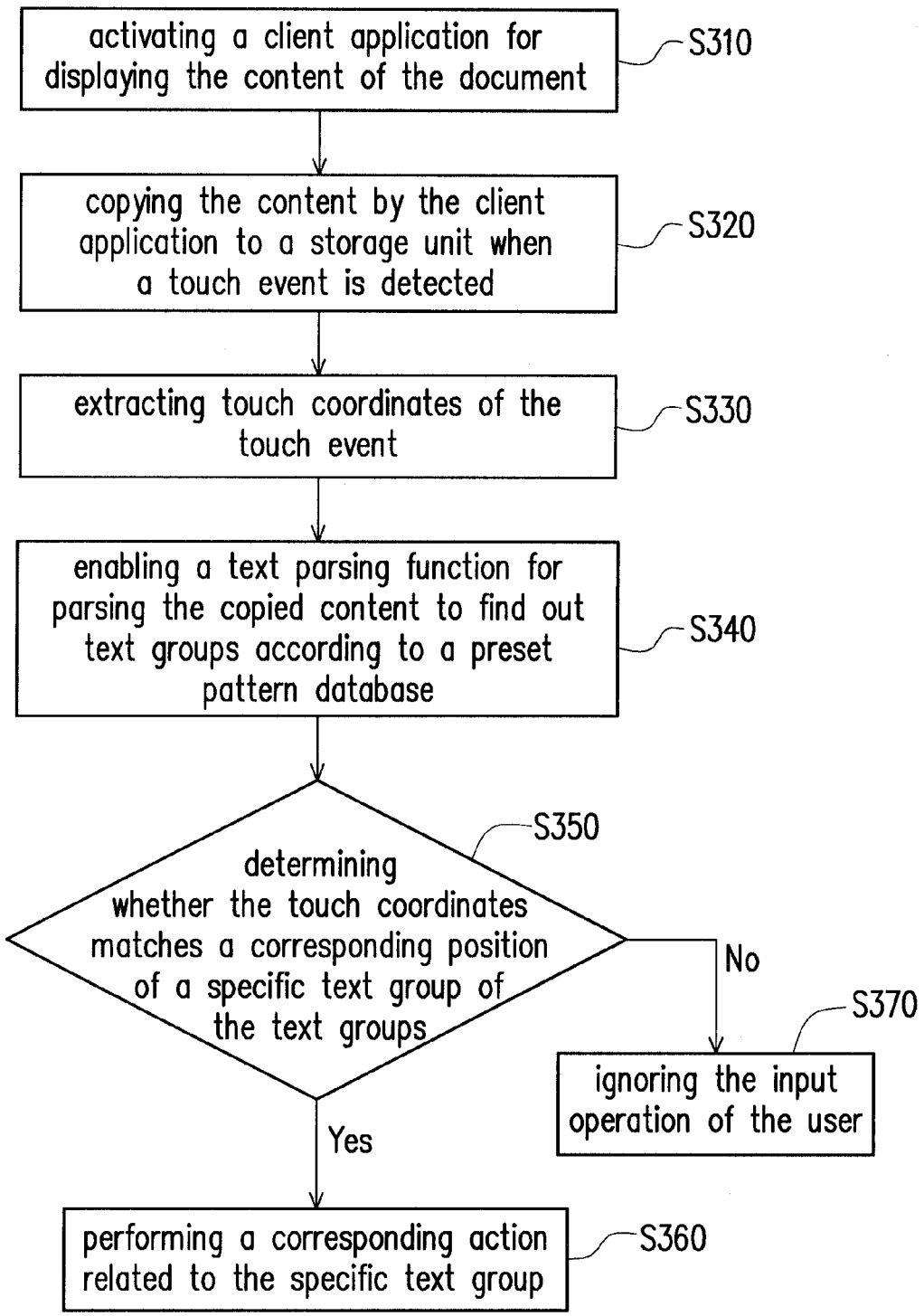
FIG. 3 is a flow chart illustrating a method for parsing a content of a document from a client application according to an exemplary embodiment of the present disclosure.

FIG. 3 is a flow chart illustrating a method for parsing a content of a document from a client application according to an exemplary embodiment of the present disclosure. Referring to both FIGS. 1A and 3, the proposed method for parsing the content of the document from the client application may be adapted for the foregoing handheld electronic apparatus 100, but the disclosure is not limited thereto. In step S310, the processing unit 130 may activate the client application for displaying the content of the document. The client application may comprise at least one of an e-mail application, an e-book application, a webpage browser, a music player, a text reader application, or the like.

In step S320, the client application may copy the content to the storage unit 120 when a touch event is detected. Specifically speaking, in some embodiments, the displaying situation of the content may be affected (e.g., the user interface will appear some changes and modification) if the processing unit 130 directly parse the content displayed by the client application. Therefore, in order to maintain the displaying situation of the content while the processing unit 130 parsing the content, the processing unit 130 may perform the following parsing procedure to the copied content, such that the displaying situation of the content would not be affected.

In step S330, the processing unit 130 may extract the touch coordinates of the touch event. And in step S340, the processing unit 130 may enable a text parsing function of the client application for parsing the copied content to find out the text groups (e.g., a plurality of link locations) according to the preset pattern database.

In step S350, the processing unit 130 may determine whether the touch coordinates matches a corresponding position of a specific text group of the text groups. In step S360, the processing unit 130 may perform the corresponding action related to the specific text group when the touch coordinates matches the corresponding position of the specific text group. Herein, the details of the steps S330 and S360 may be referred to the embodiments illustrated FIG. 1B as well, which would not be further described. When the touch coordinates does not match the corresponding position of the specific text group, in step 370, the processing unit 130 may ignore the input operation of the user.

In other embodiments, in order to follow the inherent operation mechanisms of a client application, the client application may perform an initial parsing operation to the content for finding the text groups after being activated. However, the initially parsed result of the initial parsing operation would not be saved.

Taking the client application of Android system as an example, the Linkify.java class may be modified to avoid the spans (e.g., links) being highlighted or shown in the user interface. The specific kinds of spans comprise at least one of an uniform resource locator (URL), a geographic location, location, mailto, telephone number, and real time streaming protocol (RTSP). A LinkifyURLSpan.java class is implemented for substituting the original URLSpan.java class, and the LinkifyURLSpan.java class does not store the initially parsed result. Moreover, the LinkMovementMethod.java class may be modified to avoid using any results of Linkify.java class. Therefore, no association with, or link to, the structures originally detected by the Linkify.java class would be created. Instead, the LinkMovementMethod.java class will re-parse the copied content (i.e. the content stored in the storage unit 120) when the user does a touch gesture on the touch display 110. After the user's touch gesture being detected, the LinkMovementMethod.java class may perform the corresponding action related to the specific text group when the touch coordinates matches the corresponding position of one specific text group.

The present disclosure additionally provides a computer-readable medium, which comprises a computer program used to execute the steps of the method for parsing a content of a document, this computer program is basically formed of multiple program code segments (such as, an establishment organization chart program code segment, an approval sheet program code segment, a setting program code segment, and a deployment program code segment), and after these program code segments are loaded into a handheld electronic apparatus, executes the steps of the method for parsing a content of a document.

To sum up, the embodiments of the present disclosure provide effective method for parsing the contents of documents when a touch event is detected, such that the user may operate the handheld electronic apparatus in a more intuitive way. For example, when the user touches a text group with a specific pattern (e.g., a webpage address), the processing unit may correspondingly perform some relating actions according to the parsed result, which improves user experiences of operating the handheld electronic apparatus.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A method for parsing a content of a document, adapted to a handheld electronic apparatus, the method comprising:
   activating a browser to download the document from a webpage for displaying the content of the document, wherein the browser supports a text parsing function;
   disabling the text parsing function and parsing the content of the document according to a markup language rule to generate an object parsed result;
   enabling the text parsing function and removing the object parsed result when a touch event is detected;
   parsing the content to find out text groups according to a preset pattern database and re-parsing the content of the document according to the markup language rule to generate a full parsed result when the touch event is detected and after removing the object parsed result, wherein the preset pattern database comprises a plurality of specific patterns, and a format of each of the text groups conforms to one of the specific patterns;
   determining whether a touch coordinates matches a corresponding position of a specific text group of the text groups; and
   performing a corresponding action related to the specific text group when the touch coordinates matches the corresponding position of the specific text group.

2. The method as claimed in claim 1, wherein the step of parsing the content of the document according to the markup language rule to generate the object parsed result comprises:
   transforming the content of the webpage into an object model;
   parsing the object model according to the markup language rule; and
   generating the object parsed result.

3. The method as claimed in claim 2, wherein after the step of transforming the content of the webpage into the object model, further comprises:
   removing the object parsed result if the object parsed result has existed.

4. The method as claimed in claim 1, wherein after the step of determining whether the touch coordinates matches the corresponding position of the specific text group of the text groups, further comprises:
   removing the full parsed result when the touch coordinates does not match the corresponding position of the specific text group.

5. The method as claimed in claim 1, wherein after the step of performing the corresponding action related to the specific text group, further comprises:
   removing the full parsed result.

6. The method as claimed in claim 1, wherein after the step of parsing the content to find out the text groups, further comprises:
   detecting a touch up event; and
   extracting the touch coordinates of the touch up event.

7. The method as claimed in claim 1, further comprising:
   activating a client application for displaying the content of the document.

8. The method as claimed in claim 7, wherein when the touch event is detected, further comprises:
   copying the content by the client application to a storage unit; and enabling a text parsing function for parsing the copied content to find out the text groups according to the preset pattern database.

9. The method as claimed in claim 7, wherein when the touch event is detected, further comprises:
extracting the touch coordinates of the touch event.

10. The method as claimed in claim 1, wherein the specific patterns comprise e-mail address pattern, telephone number pattern, webpage address pattern and geographic location pattern.

11. A handheld electronic apparatus, comprising:
a touch display;
a storage unit, configured to store a plurality of program instructions;
a parsing unit, configured to parse a content of a document; and
a processing unit, coupled to the touch display, the storage unit and the parsing unit, and configured to execute the program instructions to execute a parsing procedure, comprising:
activating a browser to download the document from a webpage for displaying the content of the document, wherein the browser supports a text parsing function;
disabling the text parsing function and parsing the content of the document according to a markup language rule to generate an object parsed result;
enabling the text parsing function and removing the object parsed result when a touch event is detected;
parsing the content to find out text groups according to a preset pattern database and re-parsing the content of the document according to the markup language rule to generate a full parsed result when the touch event is detected and after removing the object parsed result, wherein the preset pattern database comprises a plurality of specific patterns, and a format of each of the text groups conform to one of the specific patterns;
determining whether a touch coordinates matches a corresponding position of a specific text group of the text groups; and
performing a corresponding action related to the specific text group when the touch coordinates matches the corresponding position of the specific text group.

12. The handheld electronic apparatus as claimed in claim 11, wherein the step of parsing the content of the document according to the markup language rule to generate the object parsed result comprises:
transforming the content of the webpage into an object model;
parsing the object model according to the markup language rule; and
generating the object parsed result.

13. The handheld electronic apparatus as claimed in claim 11, wherein the parsing procedure further comprises:
removing the full parsed result when the touch coordinates does not match the corresponding position of the specific text group.

14. The handheld electronic apparatus as claimed in claim 11, wherein the parsing procedure further comprises:
detecting a touch up event after parsing the content to find out the text groups; and
extracting the touch coordinates of the touch up event.

15. The handheld electronic apparatus as claimed in claim 11, wherein the parsing procedure further comprises:
activating a client application for displaying the content of the document;
copying the content by the client application to the storage unit; and
enabling a text parsing function for parsing the copied content to find out the text groups according to the preset pattern database.

16. The handheld electronic apparatus as claimed in claim 15, wherein the parsing procedure further comprises:
extracting the touch coordinates of the touch event when the touch event is detected.

17. A non-transitory computer-readable medium storing a plurality of program instructions for loading into a handheld electronic device to execute the following steps:
activating a browser to download the document from a webpage for displaying the content of the document, wherein the browser supports a text parsing function;
disabling the text parsing function and parsing the content of the document according to a markup language rule to generate an object parsed result;
enabling the text parsing function and removing the object parsed result when a touch event is detected;
parsing the content to find out text groups according to a preset pattern database and re-parsing the content of the document according to the markup language rule to generate a full parsed result when the touch event is detected and after removing the object parsed result, wherein the preset pattern database comprises a plurality of specific patterns, and a format of each of the text groups conforms to one of the specific patterns;
determining whether a touch coordinates matches a corresponding position of a specific text group of the text groups; and
performing a corresponding action related to the specific text group when the touch coordinates matches the corresponding position of the specific text group.

* * * * *